(12) United States Patent
Mishmash et al.

(10) Patent No.: US 7,584,840 B2
(45) Date of Patent: Sep. 8, 2009

(54) STRIP BELT CONVEYOR

(76) Inventors: Rodney R. Mishmash, P.O. Box 589, Canon City, CO (US) 81245; Stephen D. Szarkowski, P.O. Box 589, Canon City, CO (US) 81245; Thomas Harding, P.O. Box 589, Canon City, CO (US) 81245; Steve DiOrio, P.O. Box 589, Canon City, CO (US) 81245

( * ) Notice: Subject to any disclaimer, the term of this patent is extended or adjusted under 35 U.S.C. 154(b) by 75 days.

(21) Appl. No.: 11/833,164

(22) Filed: Aug. 2, 2007

(65) Prior Publication Data

US 2009/0032372 A1    Feb. 5, 2009

(51) Int. Cl.
*G65G 15/12*    (2006.01)
(52) U.S. Cl. ..................... 198/817; 198/604
(58) Field of Classification Search ........... 198/817, 198/604
See application file for complete search history.

(56) References Cited

U.S. PATENT DOCUMENTS 1,206,305 A  * 11/1916 Cowley ................. 198/817
2,880,847 A  *  4/1959 Kelley .................. 198/303
3,279,587 A  * 10/1966 Gray et al. ............. 198/606
4,273,237 A  *  6/1981 Wahl et al. ............. 198/445
5,673,784 A  * 10/1997 Karpinsky et al. ........ 198/831
6,073,755 A  *  6/2000 Hilliard et al. ........... 198/813
7,232,029 B1 *  6/2007 Benedict et al. .......... 198/817

* cited by examiner

*Primary Examiner*—Mark A Deuble
(74) *Attorney, Agent, or Firm*—Robert W. Nelson; Klaas, Law, O'Meara & Malkin, P.C.

(57) ABSTRACT

A conveyor for moving items in a direction is disclosed herein. The conveyor may comprise a first end and a second end, wherein the second end is not perpendicular to the direction. A first pulley and a second pulley may be located proximate the second end with a connector connecting the first pulley to the second pulley. A first belt extends between the first end and the first pulley. A second belt extends between the first end and the second pulley. The second belt is longer than the first belt.

21 Claims, 7 Drawing Sheets

STRIP BELT CONVEYOR

BACKGROUND

Some conveyor systems require items to be conveyed from one conveyor to another. In some applications, the conveyor system includes parallel conveyors wherein items need to be transferred from a first conveyor to a second conveyor. A turn-type conveyor changes the directions of the items and a strip belt merge conveyor typically completes the transfer of the items from the first conveyor to the second conveyor.

A strip belt merge transports items in a first direction, which is sometimes referred to as being along or parallel to an axis. Items are conveyed via a plurality of parallel belts extending along the first direction. A first end of the strip belt merge receives items, which are conveyed to the second end where they transported to the second conveyor. The second end of the strip belt merge is not perpendicular to the direction items are conveyed, which enables items to be merged onto the second conveyor.

Conventional strip belt merge conveyors are powered from the first end, which causes the belts to be pushed. The pushing may cause the belts to kink or bind, which limits the speed of the belts. This limit in the speed of the belts limits the speed of the entire conveyor system.

DETAILED DESCRIPTION

Figure 1:
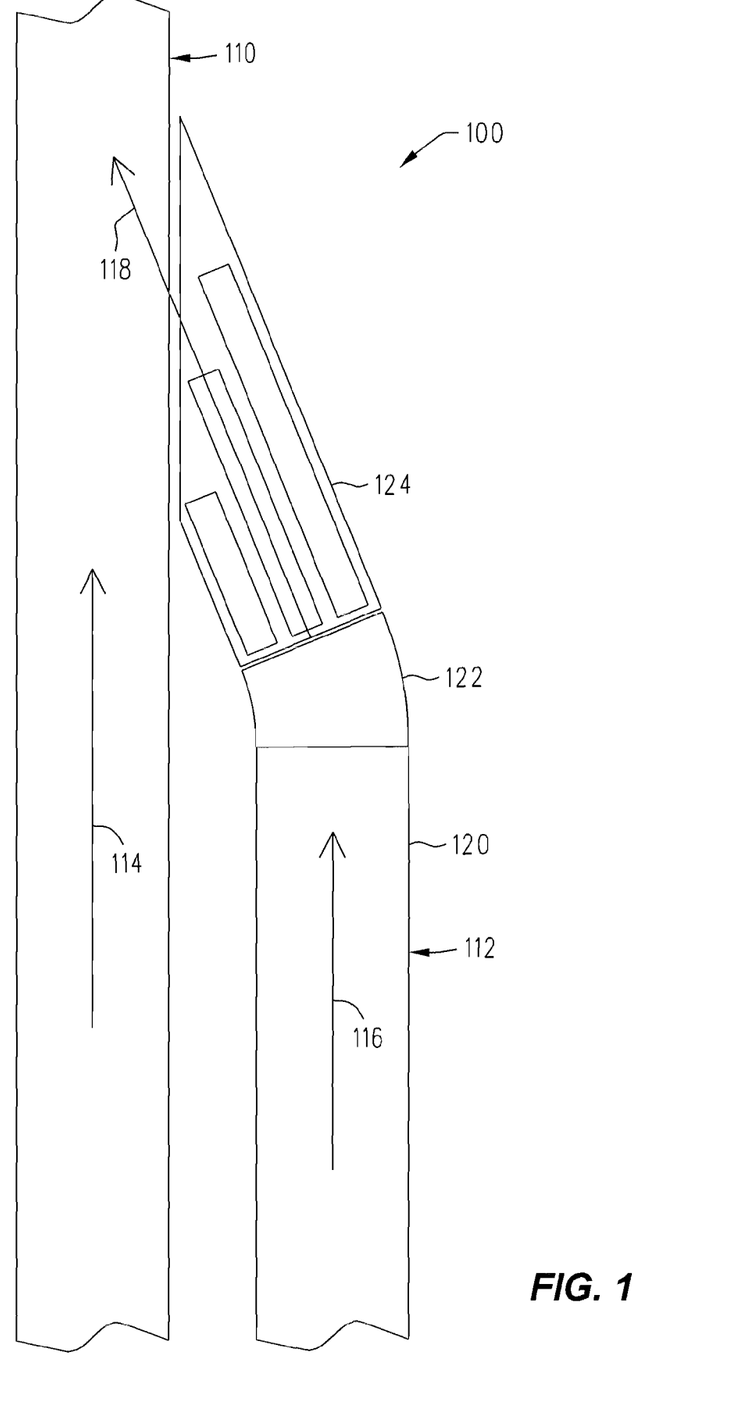
FIG. 1 is a top plan view of an embodiment of a conveyor system including a strip belt conveyor.

An embodiment of a conveyor system 100 is shown in FIG. 1. The conveyor system 100 includes a first conveyor 110 and a second conveyor 112, wherein items are conveyed from the second conveyor 112 to the first conveyor 110. In the embodiment of the conveyor system 100 described herein, the first conveyor 110 conveys items in a first direction 114. The second conveyor 112 has several sections as described below, which change the direction of items from a second direction 116, which may be substantially parallel to the first direction 114, to a third direction 118. As shown in FIG. 1, the change to the third direction 118 causes the items being conveyed on the second conveyor 112 to merge onto the first conveyor 110.

The embodiment of the second conveyor 112 described herein has three sections, a straight section 120, a curved section 122, and a merge section 124. The merge section 124 is often referred to as the strip belt merge conveyor 124 or simply the strip belt merge 124. The strip belt merge 124 uses a strip belt conveyor to merge items from the second conveyor 112 to the first conveyor 110. Other embodiments described below use the strip belt conveyor 124 to diverge or move products from the first conveyor 110.

The straight section 120 conveys items in the second direction 116 that is substantially parallel to the first direction 114. The curved section 122 changes the direction of the items to the third direction 118 so that they will intersect or merge with the first conveyor 110. The strip belt merge 124 performs the function of merging items from the second conveyor 112 to the first conveyor 110.

Figure 2:
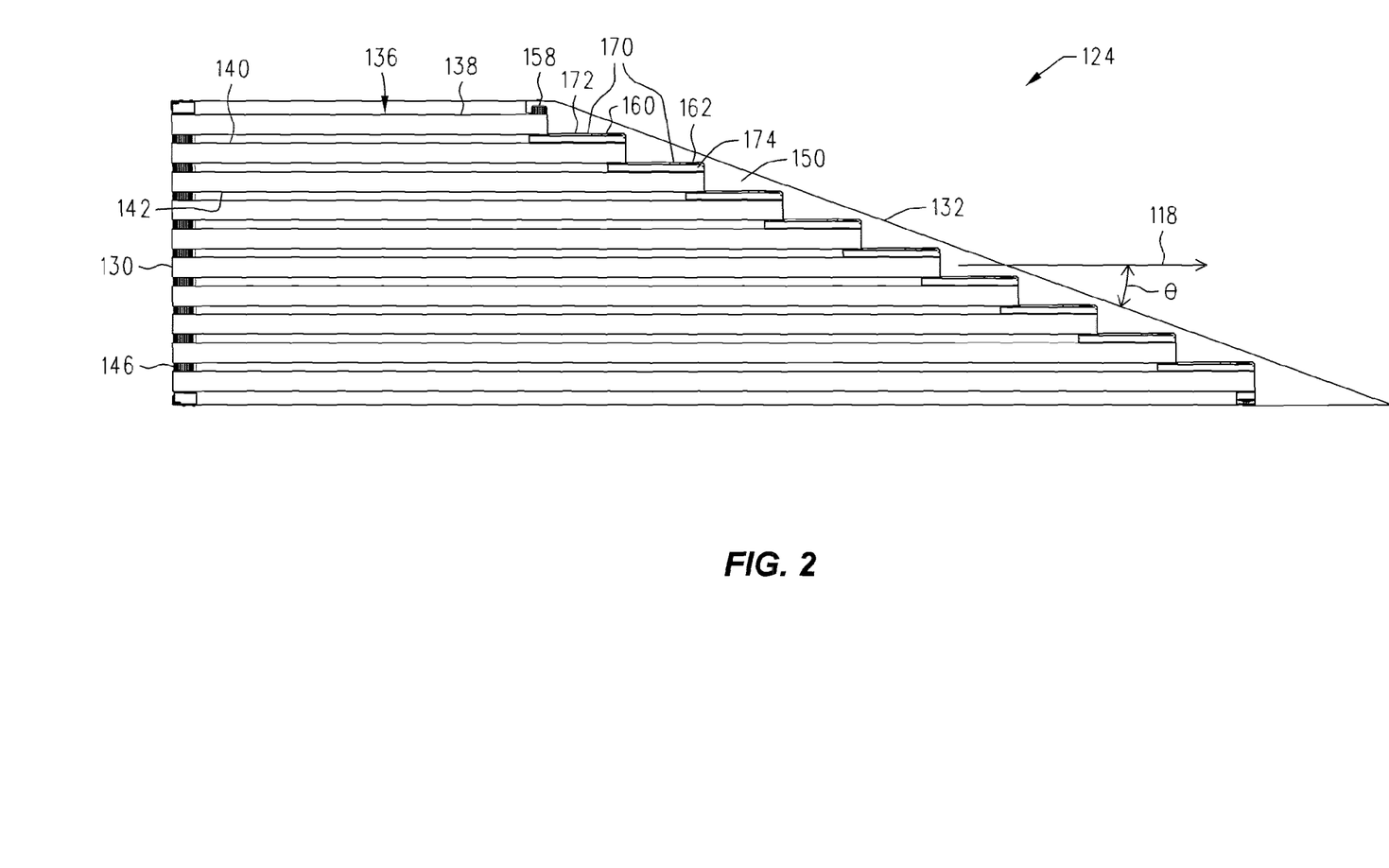
FIG. 2 is a top plan view of the strip belt conveyor of FIG. 1.

A top plan view of an embodiment of the strip belt merge 124 is shown in FIG. 2. The strip belt merge 124 is an embodiment of a strip belt conveyor. Other embodiments of the strip belt conveyor are described in greater detail below. The strip belt merge 124 has a first end 130 and a second end 132 wherein items are conveyed from the first end 130 to the second end 132 in the third direction 118. In the embodiment of the strip belt merge 124 described herein, the first end 130 is substantially perpendicular to the third direction 118. The second end 132 is at an angle θ relative to the third direction 118. The angle θ enables the strip belt merge 124 to be located adjacent the first conveyor 110 as shown in FIG. 1.

The strip belt merge 124 includes a plurality of movable belts 136. The embodiment of the strip belt merge 124 of FIG. 2 includes 10 belts 136, however, more or less belts may be used in strip belt merge conveyors. For purposes of this description, three belts will be identified and described herein; a first belt 138, a second belt 140, and a third belt 142. As shown in FIG. 2, the second belt 140 is longer than the first belt 138 and the third belt 142 is longer than the second belt 140. As described in greater detail below, some embodiments of the strip belt merge 124 use timing belts as the belts 136.

A pulley 146 is located proximate the first end 130, wherein the belts 136 rotate about or otherwise contact the pulley 146. The pulley 146, and all pulleys described herein, may also be rollers. It is noted that the strip belt merge 124 may have several pulleys or other similar devices located proximate the first end 130 instead of the single pulley 146 shown in FIG. 1. For example, each of the belts 136 may rotate about separate pulleys. As described in greater detail below, each of the belts 136 rotate about individual pulleys located proximate the second end 132. These pulleys are connected to one another so that they may all cause the belts 136 to rotate using a single motor or power source connected or otherwise operatively connected to one of these pulleys.

The strip belt merge 124 may have a platform 150 or the like that supports the belts 136 and/or the items being conveyed. In one embodiment, the platform 150 is a piece of sheet metal. In some embodiments, the platform 150 may be located solely proximate the second end 132. The platform 150 may also include a plurality of strips that are located under the belts 136 that support the belts 136 and items being conveyed by the belts 136.

The platform 150 may be in several sections, wherein one section is located proximate the second end 132. This section of the platform 150 may be hinged or removably connected to the second end 132. Thus, this section of the platform may be removed from the strip belt merge 124 or moved by way of the hinge (not shown) to allow access to components located within the strip belt merge 124.

Figure 3:
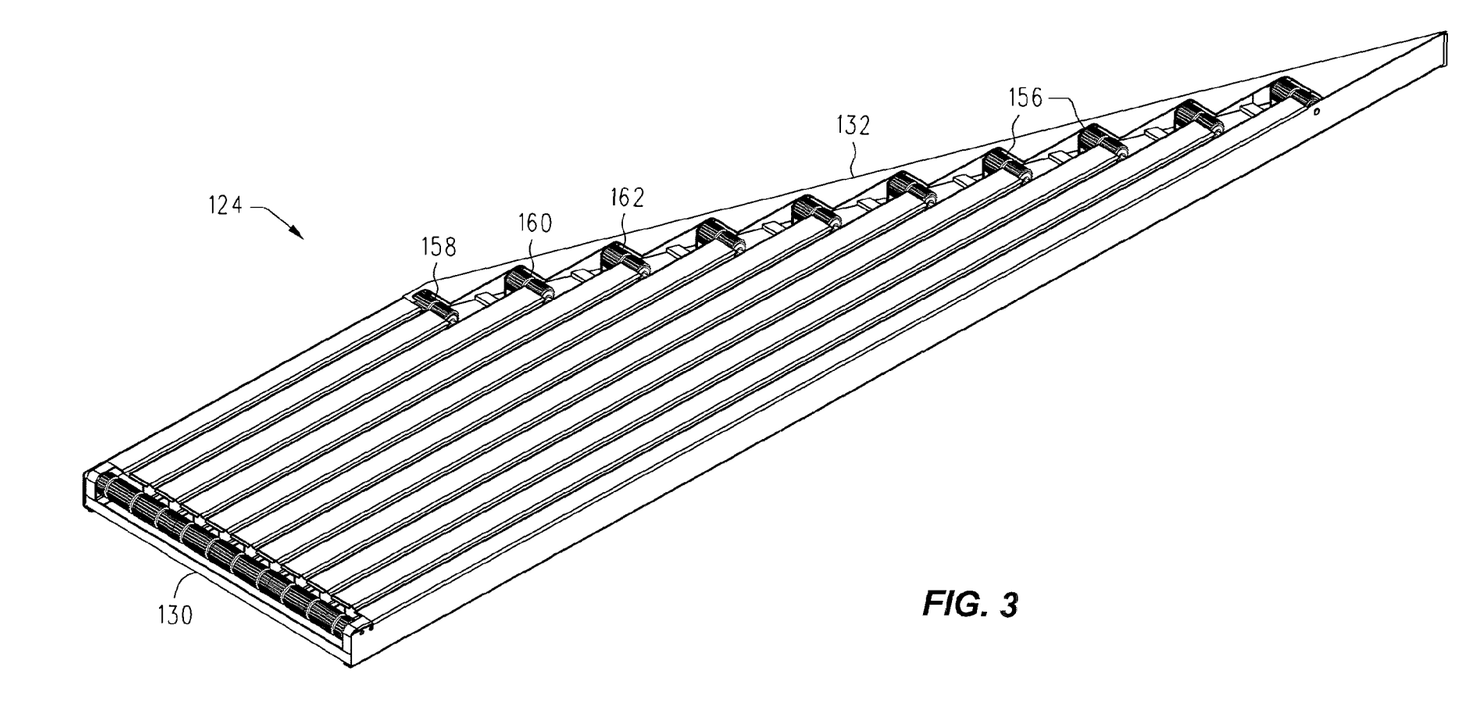
FIG. 3 is a top perspective view of the strip belt conveyor of FIG. 2 with the belts removed.

Additional reference is made to FIG. 3, which is a top perspective view of the strip belt merge 124 with the belts 136 removed. The strip belt merge 124 has a plurality of pulleys 156 located proximate the second end 132. Each of the pulleys 156 is associated with a single one of the belts 136. Accordingly, in the embodiment of the strip belt merge 124 described herein, there are ten pulleys 156. Reference is made to three individual pulleys, which are referred to as the first pulley 158, the second pulley 160, and the third pulley 162. The first pulley 158 is associated with the first belt 138, the second pulley 160 is associated with the second belt 140, and the third pulley 162 is associated with the third belt 142.

The pulleys 156 are connected to one another so that as one pulley rotates, the other pulleys rotate. This configuration enables the pulleys 156 to be rotated or powered by a motor or the like so that the pulleys 156 cause the belts 136 to move. In the embodiment of the strip belt merge 124 of FIGS. 2 and 3, secondary belts 170 are used to connect the pulleys 156 to one another. A first secondary belt 172 connects the first pulley 158 with the second pulley 160 and a second secondary belt 174 connects the second pulley 160 with the third pulley 162. Similar secondary belts are used to connect the remaining pulleys to one another.

Figure 4:
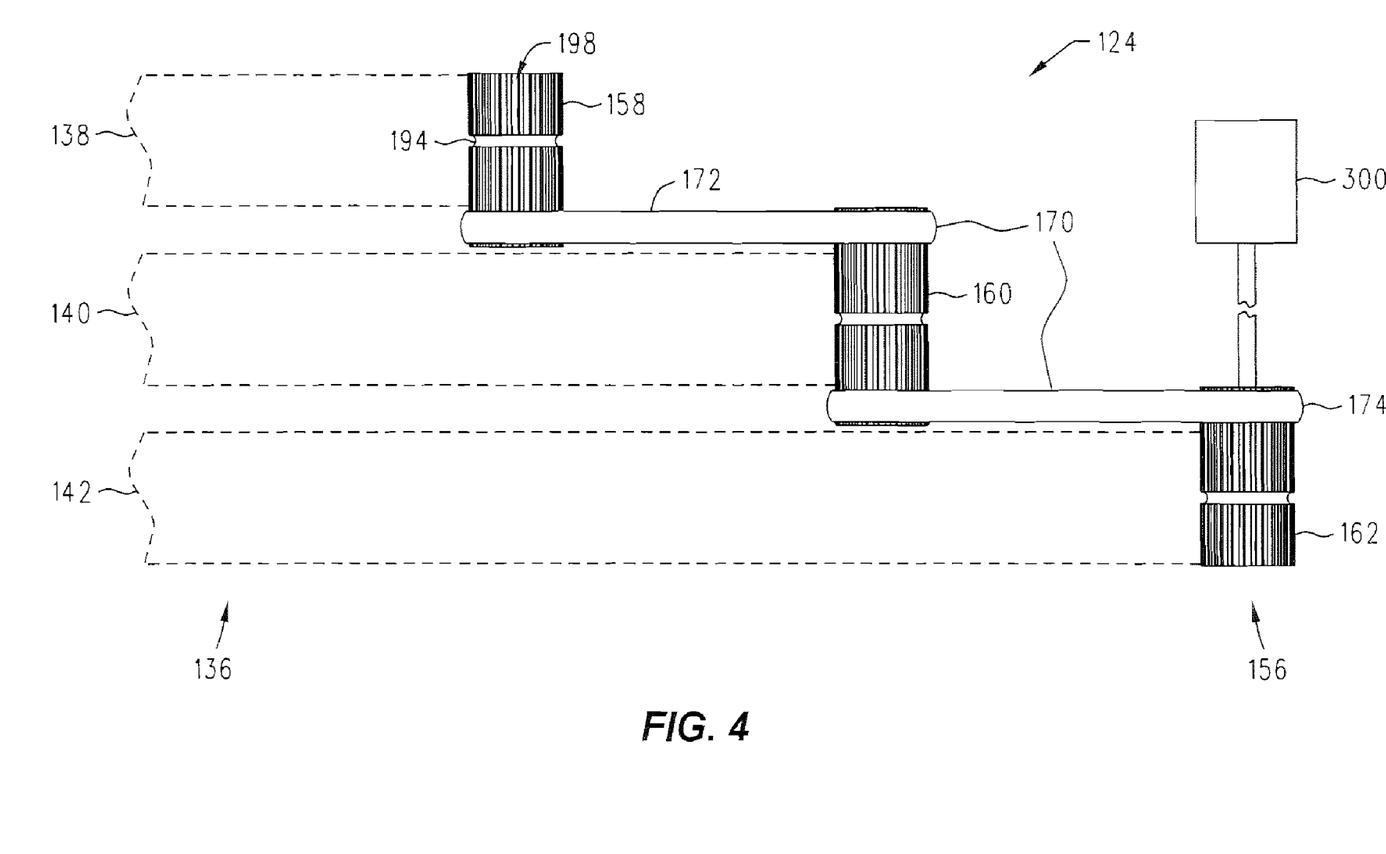
FIG. 4 is an exploded plan view of the pulleys, belts, and secondary belts of the strip belt conveyor of FIG. 3.

This belt configuration is shown in the exploded view of FIG. 4, which is a plan view of the pulleys 156, belts 136, and secondary belts 170. As shown in FIG. 4, the pulleys 156 are connected to one another by way of the secondary belts 170. Thus, when one of the pulleys 156 rotates, all the pulleys 156 rotate together, which causes all the belts 136 to move together. Therefore, a single motor may be attached to one of the pulleys 156, which will cause all the belts 136 to move. Alternatively, one or more of the pulleys 156 may be motorized. This has the benefit of enabling the strip belt merge 124 to be powered via the pulleys 156 so that the belts 136 are pulled from the second end 132, FIG. 2, of the strip belt merge 124. Conventional strip belt merge conveyors push the belts because power is applied from the first end. This pushing causes the belts to bind and limits the speed of the belts.

In the embodiment described above, the secondary belts 170 are wrapped around the pulleys 156 in a similar manner as the belts 136. Accordingly, the secondary belts 170 may serve to convey items on the strip belt merge 124. The secondary belts are also in a one to one ratio relative to the diameters of the pulleys 156. This configuration causes all the pulleys 156 to rotate at the same speed, which causes all the belts 136 to move at the same speed. Thus, items being conveyed by way of the strip belt merge 124 will not twist or turn relative to the belts 136 as they are being conveyed.

In some embodiments, it may be desirable to twist or turn the items being conveyed relative to the belts 136. The twisting or turning may serve to orient the items in a specific direction as they are transferred from the second conveyor 112, FIG. 1, to the first conveyor 110, FIG. 1. This twisting or turning may be accomplished by having the belts 136 move at different speeds, which will cause the items to turn relative to the belts 136 as they are being conveyed on the strip belt merge 124.

Figure 5:
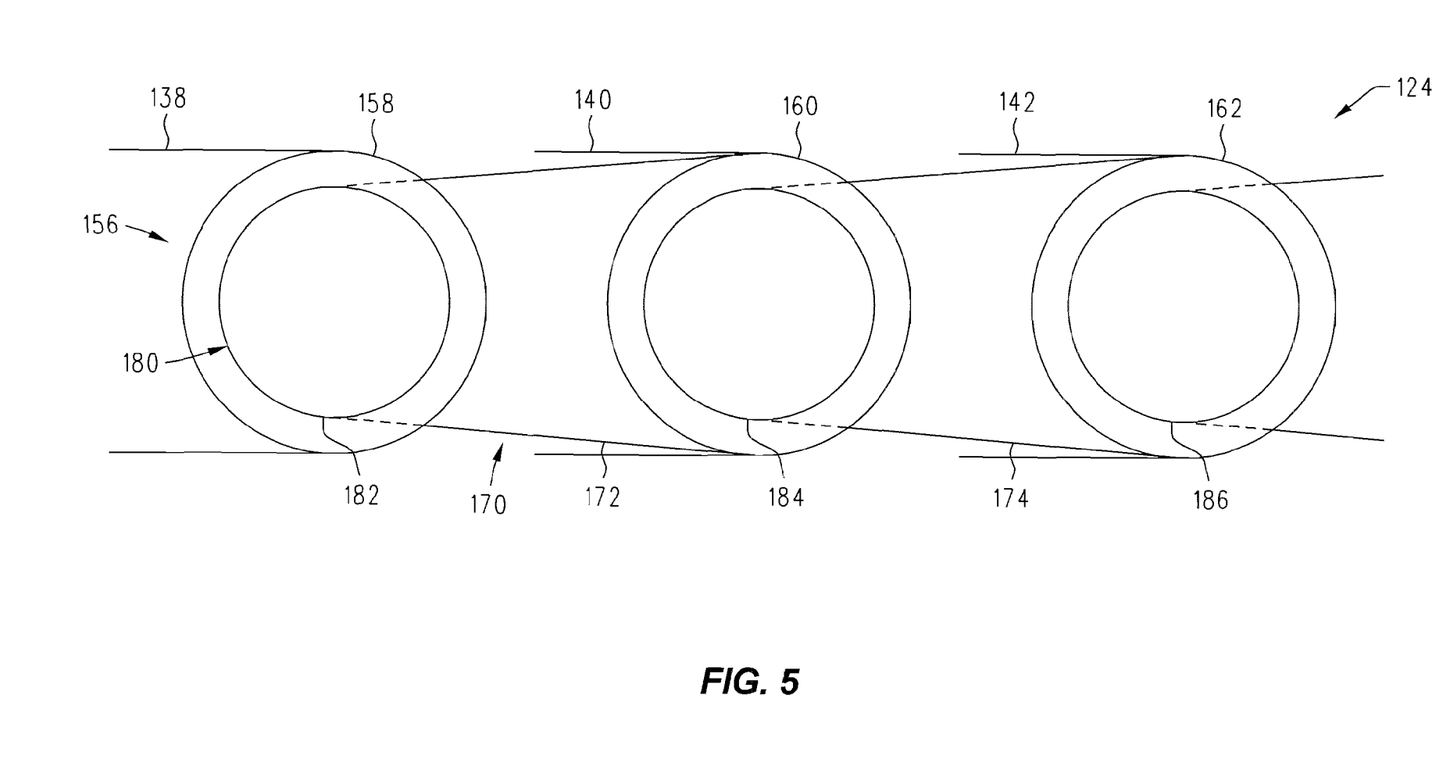
FIG. 5 is a side cut away view of a portion of an embodiment of a strip belt conveyor.

An example of a strip belt merge wherein the belts 136 move at different speeds is shown in FIG. 5, which is a side cut away view of an embodiment of the strip belt merge 124 of FIG. 2. As shown in FIG. 5, the pulleys 156 have secondary pulleys 180 connected thereto or associated therewith. The first pulley 158 has a first secondary pulley 182 associated therewith, the second pulley 160 has a second secondary pulley 184 associated therewith, and the third pulley 162 has a third secondary pulley 186 associated therewith. As shown, the diameters of the secondary pulleys 180 are smaller than the diameters of the pulleys 156.

The secondary belts 170 are connected between on of the pulleys 156 and a secondary pulley 180 associated with an adjacent pulley 156. With regard to FIG. 5, the first secondary belt 172 is connected between the first secondary pulley 182 and the second pulley 160. The second secondary belt 174 is connected between the second secondary pulley 184 and the third pulley 162. Based on the configuration described above, the first belt 138 will move faster than the second belt 140, which will move faster than the third belt 142. As described above, the different speeds of the belts 136 will cause items being conveyed by the strip belt merge 124 to turn as they are being conveyed.

The connections between the pulleys 156 has been described above as including the secondary belts 170. It is noted that other connection devices may be used in place of or in addition to the secondary belts 170. For example, a plurality of gears or the like may be used to connect the pulleys 156. In another embodiment, chains may be used in place of the secondary belts 170. In yet another embodiment, shafts may be used to connect the pulleys 156. For example, gears or the like may be connected to the pulleys 156. Shafts with corresponding gears may mesh with the gears on the pulleys 156 so as to cause all the pulleys 156 to rotate when one rotates.

Figure 6:
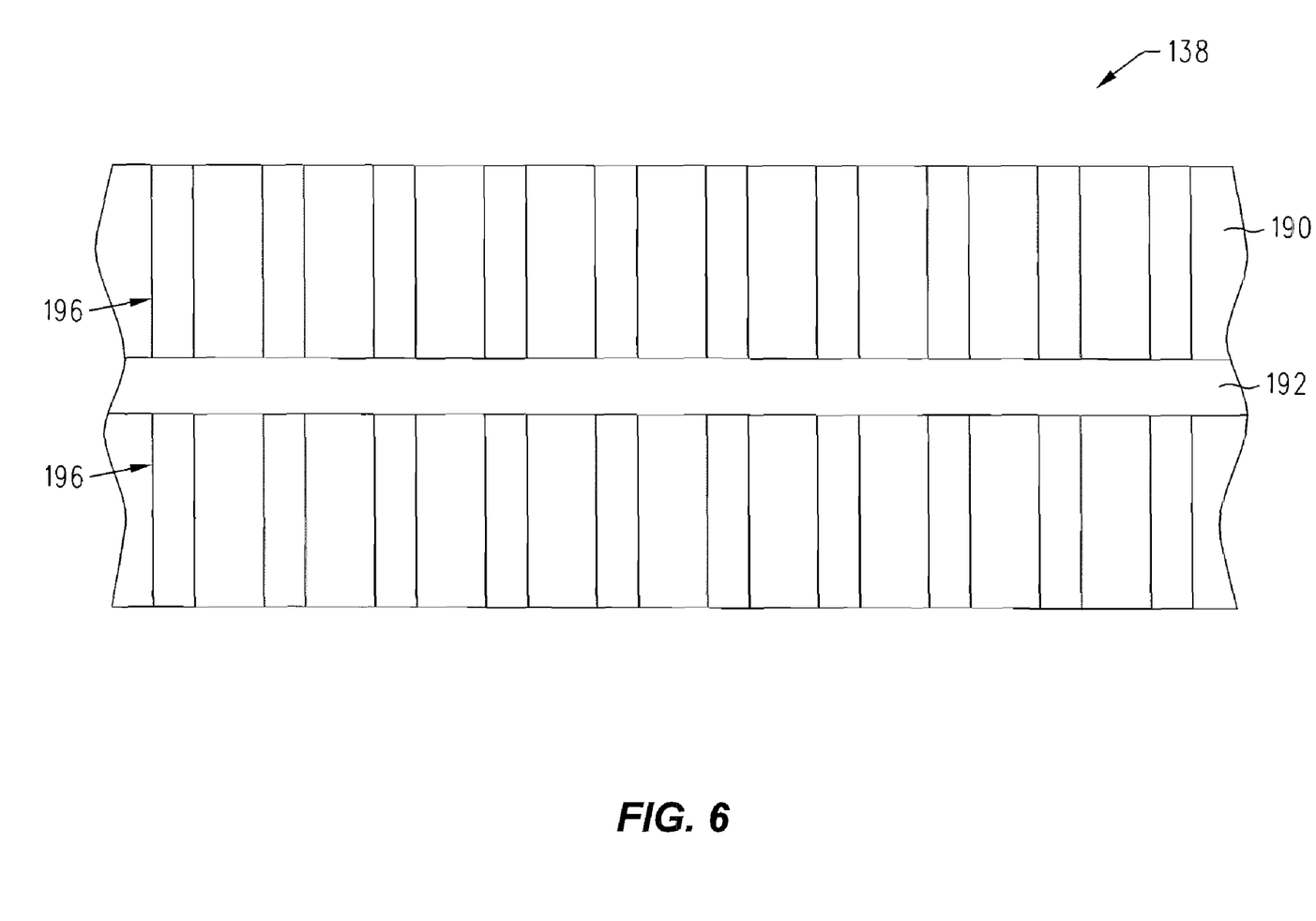
FIG. 6 is an embodiment of the underside of one of the belts of the strip belt conveyor of FIG. 2.

In some embodiments, the belts 136 are timing belts or similar thereto. An embodiment of the underside 190 of the first belt 138 is shown in FIG. 6, wherein the first belt 138 is a timing belt or the like. The embodiment of the first belt 138 has a first protrusion 192 extending the length of the first belt 138. With additional reference to FIG. 4, the first pulley 158 may have a first recessed portion 194 or indentation that serves to receive the first protrusion 192. In the embodiment of the first belt 138 of FIG. 6 and the first pulley 158 of FIG. 4, the first recessed portion 194 extends around the circumference of the first pulley 158 in order to receive the first protrusion 192. The combination of the first protrusion 192 and the first recessed portion 194 serves to maintain the first belt 138 in a fixed location relative to the first pulley 158. Thus, the first belt 138 is less likely to slip off the first pulley 158 during operation. The above-described protrusion and recessed portion may be located on all the belts 136 and pulleys 156.

The underside 190 of the first belt 138 may also have a plurality of second protrusions 196 extending substantially perpendicular to the direction of travel of the first belt 138. Likewise, the first pulley 158 may have a plurality of second recessed portions 198 that are adapted to receive the second protrusions 196 on the first belt 138. The combination of the second protrusions 196 and the second recessed portions 198 serve to move the first belt 138 similar to a cog. Therefore, friction between the first pulley 158 and the first belt 138 is not required to move the first belt 138. The above-described protrusion and recessed portion may be located on all the belts 136 and pulleys 156.

As briefly described above, the strip belt conveyor 124 may be modified to divert items from one conveyor to another. The embodiment of the strip belt conveyor being a diverter 250 is shown in the conveyor system 252 FIG. 7. In the embodiment of the conveyor 252, items are transferred from the first conveyor 256 to the second conveyor 258, wherein the strip belt conveyor 250 facilitates the transfer.

Figure 7:
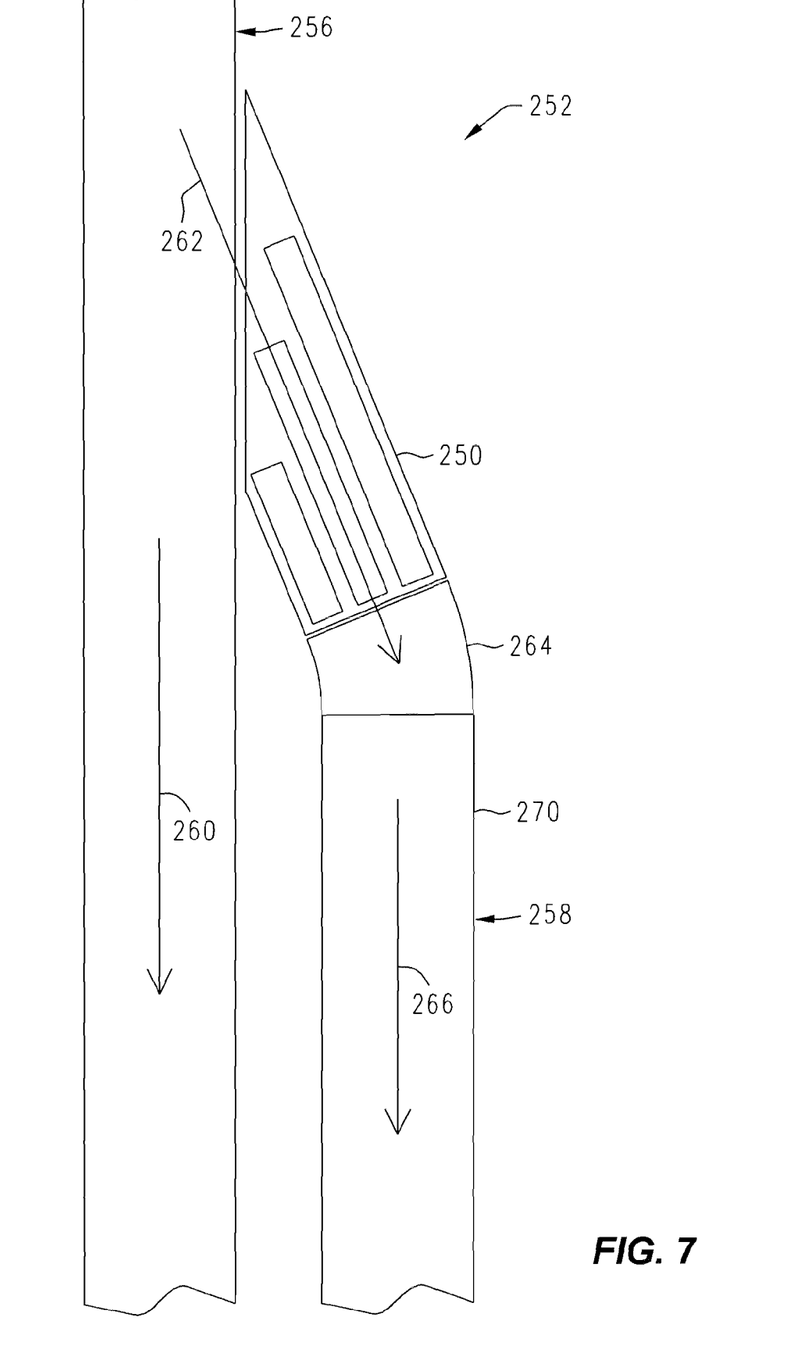
FIG. 7 is an embodiment of a strip belt conveyor used as a diverter.

In the embodiment of FIG. 7, items are conveyed by way of the first conveyor 256 in a first direction 260. Some items will need to be conveyed to the second conveyor 258. These items may encounter a diverter or the like (not shown), which causes the items to be diverted to the strip belt conveyor 250 and conveyed in a second direction 262. A curved section 264 changes the direction of the items to a third direction 266 where they are transferred to a straight section 270.

Referring to FIG. 2, the strip belt conveyor 124 used as a diverter conveys items in a direction opposite the direction 118. Accordingly, the strip belt conveyor 250 of FIG. 7 may be substantially similar to the strip belt merge of FIG. 2, except that the belts 136 move in a direction opposite the direction 118. This change in direction may be achieved by changing the direction of the motor, which will change the direction of the movement of the belts 136. In another embodiment, power may be applied to the pulley 146, which will serve to pull the belts rather than push them.

The secondary belts 170 serve to increase the moving surface area of the strip belt conveyor 124, 250. Accordingly, when items are diverted from the first conveyor 256 to the strip belt conveyor 124, 250, the transfer may be faster and smoother by use of the secondary belts 170. In some embodiments, the secondary belts 170 may not be used.

The strip belt conveyors 124, 250 have been described above as having a first end 130 substantially perpendicular to the direction 118 and a second end that is not perpendicular to the direction 118. This configuration enables the strip belt conveyors 125, 250 to function with the conveyor systems 100, 252 of FIGS. 1 and 7. In some embodiments, the first end 130 is configured similar to the second end 132. Accordingly, the pulleys 156 described above may replace the pulley 146. This configuration enables the first end to be at an angle that is not perpendicular to the direction 118. In this configuration, the secondary belts 170 may or may not be used depending on the operation of the conveyor. With regard to FIG. 1, the above described configuration may eliminate the need for the curved section 122.

What is claimed is:

1. A conveyor for moving items in a direction, said direction being parallel an axis, said conveyor comprising:
    a first end;
    a second end, wherein said second end is not perpendicular to said axis;
    a first pulley located proximate said second end;
    a second pulley located proximate said second end;
    a connector belt connecting said first pulley to said second pulley;
    a first belt extending between said first end and said first pulley; and
    a second belt extending between said first end and said second pulley, said second belt being longer than said first belt.

2. The conveyor of claim 1 and further comprising a motor operatively connected to said first pulley.

3. The conveyor of claim 1, wherein said first belt comprises:
    a first side, wherein items being conveyed contact said first side;
    a second side located opposite said first side; and
    at least one protrusion extending from said second side.

4. The conveyor of claim 3, wherein said first pulley has at least one recessed portion to receive said at least one protrusion.

5. The conveyor of claim 3, wherein said at least one protrusion extends the length of said first belt.

6. The conveyor of claim 5, wherein said first pulley has at least one recessed portion to receive said at least one protrusion.

7. The conveyor of claim 3, wherein said at least one protrusion extends substantially perpendicular to said axis.

8. The conveyor of claim 7, wherein said first pulley has at least one recessed portion to receive said at least one protrusion.

9. The conveyor of claim 1, and further comprising a third pulley located proximate said first end, wherein said first belt contacts said third pulley; and a motor operatively connected to said third pulley.

10. The conveyor of claim 1, wherein said direction extends from said first end toward said second end.

11. The conveyor of claim 1, wherein said direction extends from said second end toward said first end.

12. The conveyor of claim 1, wherein said first end is not perpendicular to said axis.

13. A method of transferring items from a first conveyor to a second conveyor, said method comprising:
    providing a conveyor having a first end and a second end, wherein said first end is proximate said first conveyor, and wherein said second end is proximate said second conveyor, said second end being angled to fit proximate said second conveyor;
    providing a plurality of straight belts extending between said first end and said second end, a first of said plurality of belts contacting a first pulley and a second of said plurality of belts contacting a second pulley, said first pulley and said second pulley being located proximate said second end;
    connecting said first pulley with said second pulley; and
    applying power to said first pulley.

14. The method of claim 13, wherein one of first belt comprises a first side and a second side, said second side contacting said first pulley; said second side having at least one protrusion extending therefrom; said first pulley having at least one recessed portion located therein; said method further comprising locating said at least one protrusion in said at least one recessed portion.

15. The method of claim 13, wherein said applying power causes said belts to move in a manner so that items move from said first end toward said second end.

16. The method of claim 13, wherein said applying power causes said belts to move in a manner so that items move from said second end toward said first end.

17. The method of claim 13, wherein said first belt moves faster than said second belt.

18. A strip belt merge conveyor for moving items in a direction, said conveyor comprising:
    a first end;
    a second end, wherein said second end is not perpendicular to said direction;
    a first pulley located proximate said second end;
    a second pulley located proximate said second end;
    a first straight belt extending between said first end and said first pulley;
    a second straight belt extending between said first end and said second pulley, said second belt being longer than said first belt; and
    a third belt connecting said first pulley to said second pulley.

19. A conveyor system comprising:
    a first conveyor;
    a second conveyor;
    a third conveyor operable to transfer items from said first conveyor to said second conveyor in a direction parallel an axis, said third conveyor comprising:
        a first end, wherein said first end is not perpendicular to said axis, said first end being located adjacent a side of said first conveyor;
        a second end, said second end being located proximate said second conveyor;
        a first pulley located proximate said first end;
        a second pulley located proximate said first end;
        a first belt extending between said first pulley and said second end;
        a second belt extending between said second pulley and said second end, said second belt being longer than said first belt; and
        a third belt extending between said first pulley and said second pulley.

20. A conveyor for moving items in a direction, said direction being parallel an axis, said conveyor comprising:
- a first end;
- a second end, wherein said second end is not perpendicular to said axis;
- a first pulley located proximate said second end;
- a second pulley located proximate said second end;
- a connector chain connecting said first pulley to said second pulley;
- a first belt extending between said first end and said first pulley; and
- a second belt extending between said first end and said second pulley, said second belt being longer than said first belt.

21. The conveyor of claim 20, wherein said first end is not perpendicular to said axis.

* * * * *